United States Patent
Ruan (10) Patent No.: US 10,991,920 B2
(45) Date of Patent: Apr. 27, 2021

(54) BATTERY PACK

(71) Applicant: Contemporary Amperex Technology Co., Limited, Ningde (CN)

(72) Inventor: Shengshen Ruan, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 70 days.

(21) Appl. No.: 16/424,789

(22) Filed: May 29, 2019

(65) Prior Publication Data
US 2020/0161597 A1    May 21, 2020

(30) Foreign Application Priority Data
Nov. 15, 2018   (CN) .......................... 201811361300.7

(51) Int. Cl.
*H01M 2/02*    (2006.01)
*H01M 2/04*    (2006.01)
*H01M 2/10*    (2006.01)

(52) U.S. Cl.
CPC ......... *H01M 2/024* (2013.01); *H01M 2/0247* (2013.01); *H01M 2/0439* (2013.01); *H01M 2/1016* (2013.01)

(58) Field of Classification Search
CPC ............. H01M 2/1016; H01M 2/1077; H01M 2/1072; H01M 2/1022
See application file for complete search history.

(56) References Cited

U.S. PATENT DOCUMENTS

| | | | | |
|---|---|---|---|---|
| 9,640,789 | B2 * | 5/2017 | Yang | H01M 2/204 |
| 2010/0294721 | A1 * | 11/2010 | Frazier | G01M 3/04 |
| | | | | 210/660 |
| 2014/0113170 | A1 * | 4/2014 | Wu | H01M 2/1022 |
| | | | | 429/100 |

(Continued)

FOREIGN PATENT DOCUMENTS

| | | |
|---|---|---|
| CN | 207282567 U | 4/2018 |
| CN | 207353296 U | 5/2018 |

(Continued)

OTHER PUBLICATIONS

CN207353296 English machine translation (Year: 2020).*

(Continued)

*Primary Examiner* — Ula C Ruddock
*Assistant Examiner* — Armindo Carvalho, Jr.
(74) *Attorney, Agent, or Firm* — Law Offices of Liaoteng Wang (57) ABSTRACT

The disclosure relates to a battery pack. The battery pack comprises: a casing; a cover, which is disposed to cover the casing; a battery assembly, which is disposed within an enclosed space formed by the casing and the cover; and an end assembly, which includes a panel and two or more connectors fixed to the panel. The battery assembly is electrically connected to a device outside the enclosed space by the connectors. The panel is sealedly connected to the casing or the cover, and is fixedly connected to the casing by a bracket. In the battery pack according to the embodiment of the disclosure, the end assembly integrated with two or more connectors is fixed to the casing by the bracket, thus the weight of the connectors is borne by the bracket and the connectors are not easy to be detached.

11 Claims, 6 Drawing Sheets

(56) References Cited

U.S. PATENT DOCUMENTS

| | | | |
|---|---|---|---|
| 2015/0050523 A1* | 2/2015 | Lee | H01M 2/0212 |
| | | | 429/7 |
| 2017/0033341 A1* | 2/2017 | Chujo | H01M 2/1229 |
| 2018/0166840 A1* | 6/2018 | Okazaki | H01M 10/48 |
| 2018/0272853 A1* | 9/2018 | Wang | H01M 2/0247 |
| 2018/0326863 A1* | 11/2018 | Soki | H02J 7/04 |

FOREIGN PATENT DOCUMENTS

| | | | |
|---|---|---|---|
| CN | 207529980 U | | 6/2018 |
| CN | 207834393 U | | 9/2018 |
| CN | 208014788 U | | 10/2018 |
| CN | 209071422 U | | 7/2019 |
| EP | 2131414 A1 | | 12/2009 |
| JP | 2015153508 A | | 8/2015 |
| KR | 20120005727 A | * | 1/2012 |

OTHER PUBLICATIONS

KR20120005727A English machine translation (Year: 2020).*
The extended European search report for European Application No. 19179882.6, dated Jan. 21, 2020, 7 pages.
PCT International Search Report for PCT/CN2019/118665, dated Mar. 2, 2020, 10 pages.

* cited by examiner

BATTERY PACK

CROSS-REFERENCE TO RELATED APPLICATION

This application is based on and claims priority to Chinese Patent Application No. 201811361300.7 filed on Nov. 15, 2018, which is incorporated herein by reference in its entirety.

TECHNICAL FIELD

The disclosure relates to the technical field of power battery, and in particular to a battery pack.

BACKGROUND

With the increasingly environmental protection awareness and the risingly developing low-carbon economy, new energy vehicles will become the mainstream of future automotive industry. The reduction of the height of the vehicle helps to reduce the running resistance of the vehicle and thus to save running energy. However, the premise of reducing the height of the vehicle is to ensure that the passability and comfort of the vehicle cannot be affected, so the reduction of the height will be largely realized by reducing the overall height of the power battery and increasing the energy density of the power battery.

In the prior art, various connectors of the power battery are generally fixed to the casing. When the battery pack is subjected to a large impact, the connectors may fall off directly from the casing, causing short-circuit of the electrical circuit in the battery or even causing a fire accident. In addition, the connector has a certain weight, which may cause sealing failure between the connector and the casing due to vibration or the like during long-term use.

SUMMARY

An object of an embodiment of the disclosure is to provide a battery pack having high safety and sealing reliability.

One embodiment of the disclosure provides a battery pack. The battery pack includes a casing; a cover, which is disposed to cover the casing; a battery assembly, which is disposed within an enclosed space formed by the casing and the cover; an end assembly, which includes a panel and two or more connectors fixed to the panel. The battery assembly is electrically connected to a device outside the enclosed space by the connector. The panel is sealedly connected to the casing or the cover, and is fixedly connected to the casing by a bracket.

According to one aspect of the embodiment of the disclosure, the bracket comprises a base and a first fixing portion disposed on the base, the first fixing portion is connected to the panel, and the base is connected to the casing.

According to one aspect of the embodiment of the disclosure, the first fixing portion is disposed to be inclined by a predetermined angle θ with respect to a vertical plane, and the first fixing portion has an angle of (90°-θ) with the base.

According to one aspect of the embodiment of that present disclosure, a first mount hole is provided in a first fixing portion, a weight reducing groove is provided on a circumferential side of the first mounting hole, a convex column is provided on the side of the panel near to first fixing portion, and the panel stretches into the weight reducing groove through the convex column and is connected to the first fixing portion.

According to one aspect of the embodiment of the disclosure, the first fixing portion is further provided with a support column, which extends toward the panel and is used to support the panel.

According to one aspect of the embodiment of that present disclosure, the support column includes a first support column which is disposed away from the base and a second support column which is disposed adjacent to the base, the first support column abuts against the panel, the second support column has a top end which protrudes from the panel, and the second support column supports the panel by a side portion connected to the top end.

According to an aspect of the embodiment of the disclosure, the bracket further includes a second fixing portion, which is disposed on the base and intersects with the first fixing portion.

According to one aspect of the embodiment of the disclosure, the battery pack further includes a battery monitoring unit which is electrically connected to the battery assembly, the second fixing portion is provided with a second mounting hole, through which the second fixing portion is connected to the battery monitoring unit.

According to one aspect of the embodiment of the disclosure, a through hole is provided in the second fixing portion, a protective edge protruding outwardly is provided on a circumferential side of the through hole, and wiring harness of the more connectors passes through the through hole.

According to one aspect of the embodiment of the disclosure, a mounting portion is provided on the casing, the base is provided with a third mounting hole, through which the base is connected to the mounting portion of the casing.

According to one aspect of an embodiment of the disclosure, the mounting portion is provided with a positioning column and a threaded hole corresponding to the third mounting hole, the positioning column stretches into the third mounting hole, and the threaded hole is engaged with a fastener passing through the third mounting hole.

According to one aspect of the embodiment of that disclosure, the number of the brackets is at least two, and an anti-collision member is provided between the brackets.

According to one aspect of the embodiment of that disclosure, the cover is provided with a window, through which the connectors are located outside the enclosed space, and through which the panel is sealedly connected to the cover.

In the battery pack according to the embodiment of the disclosure, the end assembly integrated with two or more connectors is fixed to the casing by the bracket, so the weight of the connectors is borne by the bracket and the connectors are not easy to be detached. Therefore, the probability of sealing failure due to the self-weight of the connectors is reduced, and the sealing reliability and safety of the battery pack are improved.

BRIEF DESCRIPTION OF THE DRAWINGS

Features, advantages, and technical effects of the exemplary embodiments of the disclosure will be described below with reference to the drawings.

In the drawings, the same reference numerals are used to indicate the same components. The drawings are not drawn to the actual scale.

DETAILED DESCRIPTION

Features and exemplary embodiments according to various aspects of the disclosure are described in detail below. In the following detailed description, numerous specific details are set forth to provide comprehensive understanding of the disclosure. However, it will be apparent to the skilled in the art that the disclosure may be practiced without some of the specific details. The following description of the embodiments is merely to provide better understanding of the disclosure. In the figures and the following description, at least some of the known structures and techniques are not shown, to avoid unnecessarily obscuring the disclosure. Further, for clarity, the dimension of some of the structures may be enlarged. Furthermore, the features, structures, or characteristics described hereinafter may be combined in any suitable manner in one or more embodiments.

The orientation terms appearing in the following description refer to the directions shown in the drawings, and are not intended to limit the specific structure of the disclosure. In the description of the disclosure, it should be noted that, unless otherwise stated, the terms "mount" and "connect" are to be understood broadly, for example, they may be fixed connection or detachable connection or integral connection; or may be direct connection or indirect connection. The specific meaning of the above terms in the disclosure may be understood by the skilled in the art based on the specific situation. Moreover, the terms "first", "second", and the like are used for descriptive purposes only, and should not to be construed as indicating or implying relative importance or implicitly indicating the number of the involved technical features. Thus, features involving "first", "second", and the like may include at least one of the features, either explicitly or implicitly.

In order for better understanding of the disclosure, the battery pack according to the embodiment of the disclosure will be described in detail with reference to FIGS. 1 to 7.

Figure 1:
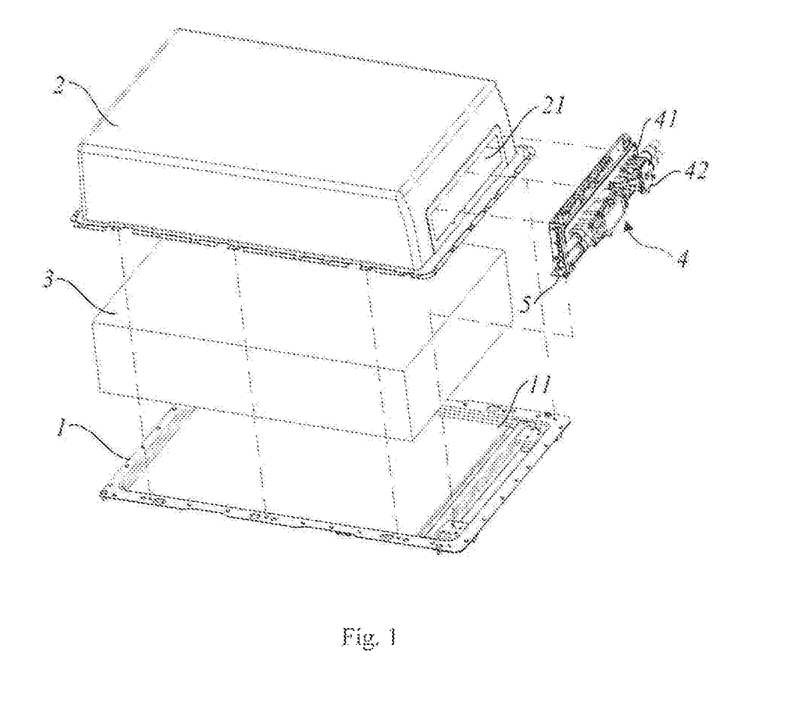
FIG. 1 shows a schematic exploded view of a battery pack according to an embodiment of the disclosure.
Figure 2:
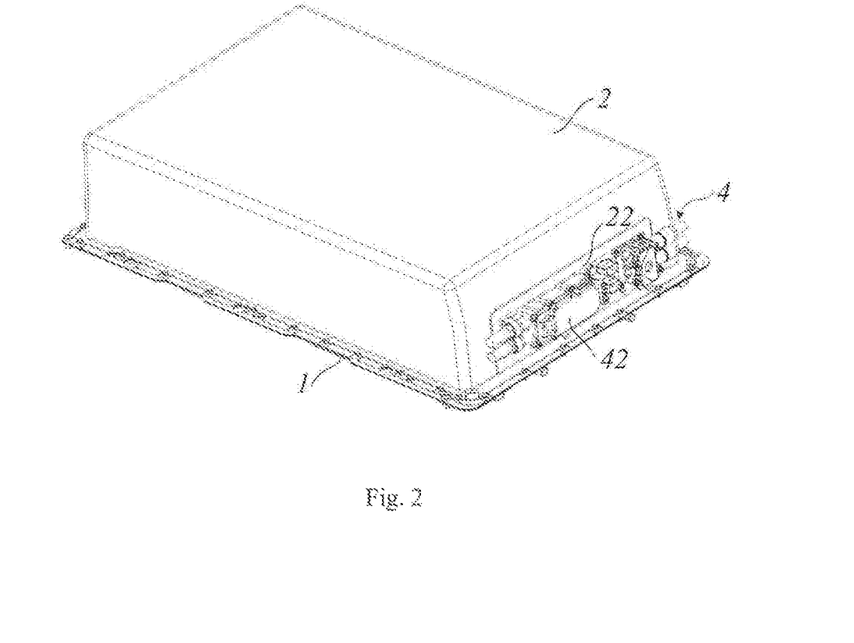
FIG. 2 shows a schematic structural view of the battery pack shown in FIG. 1 after assembled.

With reference to FIGS. 1 to 2, the embodiment of the disclosure provides a battery pack, including a casing 1, a cover 2, a battery assembly 3, and an end assembly 4.

The casing 1 has a first receiving cavity 11. The cover 2 is disposed to cover the casing 1. The cover 2 has a second receiving cavity 21. The battery assembly 3 is disposed within an enclosed space formed by the first receiving cavity 11 and the second receiving cavity 21.

The end assembly 4 includes a panel 41 and two or more connectors 42 fixed to the panel 41. The battery assembly 3 is electrically connected to a device (for example, another battery pack, a high-voltage box or the like) outside the enclosed space by the connectors 42. The panel 41 is sealedly connected to the casing 1 or the cover 2, and is fixedly connected to the casing 1 by a bracket 5.

The battery pack generally includes, but is not limited to, the following connectors: a positive high-voltage connector and a negative high-voltage connector for achieving electrical connection of the battery assembly 3, a low-voltage input connector and a low-voltage output connector for detecting operating voltage, temperature, and the like of the battery assembly 3, and a heating input connector and a heating output connector for heating the battery assembly 3. Further, the battery pack includes safety members such as a manual maintenance switch and an explosion-proof valve.

The above various connectors and the safety members are fixed integrally to the panel 41 by the end assembly 4 according to the embodiment of the disclosure, without providing a plurality of openings in the casing 1 or the cover 2. As a result, the structure is easy, it is no need to provide additional sealing elements, and thereby the sealing reliability of the end assembly 4 with the casing 1 or the cover 2 is improved. If the sealing of a single connector or safety member fails, it is only need to replace the panel 41 or the corresponding sealing element. As a result, the operation is simple and the maintenance cost can be reduced.

Since the end assembly 4 is fixed to the casing 1 by the bracket 5, the bracket 5 supports and stabilizes the end assembly 4. Therefore, it is possible to prevent the connectors 42 detaching from the casing 1 or the cover 2 when the battery pack is subjected to a large impact.

In the battery pack according to the embodiment of the disclosure, the end assembly 4 integrated with two or more connectors 42 is fixed to the casing 1 by the bracket 5, so the weight of the connectors is borne by the bracket 5 and the connectors are not easy to be detached. Therefore, the probability of sealing failure caused by the self-weight of the connectors 42 is reduced, and the sealing reliability and safety of the battery pack are improved.

In order to prevent the connector 42 from being damaged or detached when the battery pack is subjected to a large impact, the end assembly 4 may be fixed to the side of the battery pack without being fixed the top of the battery pack. Therefore, the overall height of the battery pack can be reduced.

Specifically, a window 22 is provided on one side of the cover 2, through which the connectors 42 are located outside the enclosed space. The panel 41 covers the window 22 from one side of the second receiving cavity 21. The panel 41 is sealedly connected to the cover 2 through the window 22. During assembly, the battery assembly 3 is firstly fixed to the casing 1 and the end assembly 4 is assembled to the casing 1 by the bracket 5; after the connectors and the safety members on the end assembly 4 pass through the window 22 of the cover 2, the cover 2 is covered on the casing 1; after the casing 1 and the cover 2 are sealedly connected by fasteners and sealing rings, the panel 41 of the end assembly 4 is sealedly connected to the cover 2, for example, by using a sealing ring provided between the window 22 and the panel 41 and then by applying the sealant or the like.

In addition, since the casing 1 needs to carry the weight of the battery assembly 3, the casing 1 is generally made of metal material. According to the embodiment of the disclosure, the end assembly 4 is fixed to the casing 1 by the bracket 5, and the end assembly 4 is located inside the second receiving cavity 21. As a result, the structural strength requirement of the cover 2 is reduced as long as the sealing requirement of the cover 2 is satisfied. Therefore, the cover 2 may be made of non-metal material having a relatively low density, such as plastic, lightweight composite material, or the like. As a result, the material density of the casing 1 is larger than that of the cover 2, and thereby the weight of the battery pack is reduced.

On this basis, the height of the casing 1 made of the metal material may be designed as small as possible while the load-bearing requirement is satisfied, and the height of the cover 2 made of the material with lower density may be designed relatively high, so that the depth of the second receiving cavity 21 is greater than the depth of the first receiving cavity 11. Therefore, the weight of the battery pack is further reduced and the energy density of the battery pack is improved.

The specific structure of the battery pack according to the embodiment of the disclosure is described in further detail below with reference to the accompanying drawings.

Referring to FIGS. 3 to 7, as described above, the above various connectors 42 and the safety members are integrally fixed to the panel 41 by the end assembly 4, and are fixed to the casing 1 by the bracket 5. The number of the brackets 5 may be two, which are respectively provided on both sides of the panel 41.

Figure 3:
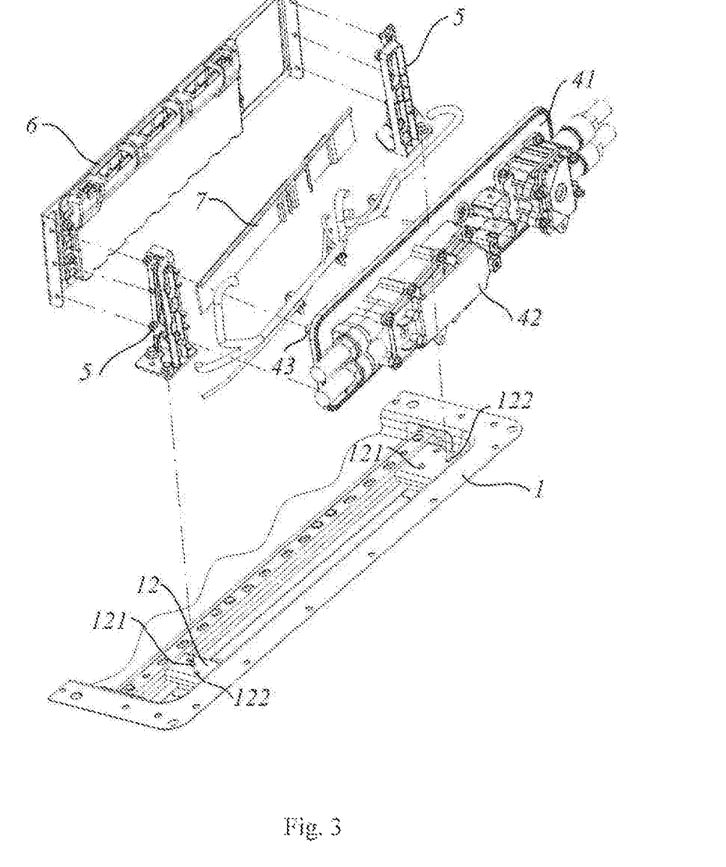
FIG. 3 shows a schematic exploded view of the end assembly and the bracket in the battery pack shown in FIG. 1.
Figure 4:
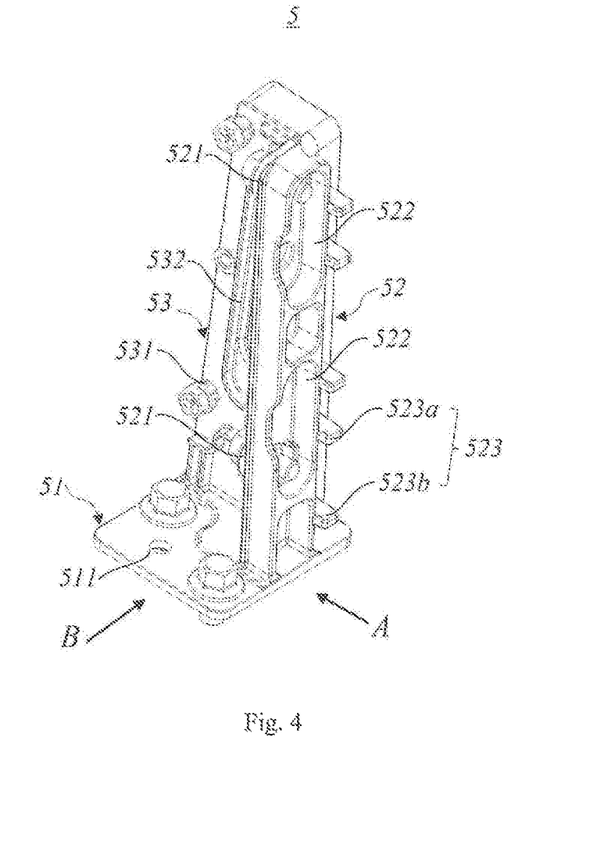
FIG. 4 shows a schematic structural view of the bracket in the end assembly shown in FIG. 3.

The bracket 5 includes a base 51 and a first fixing portion 52 disposed on the base 51. The first fixing portion 52 is connected to the panel 41, and the base 51 is connected to the casing 1.

Figure 5:
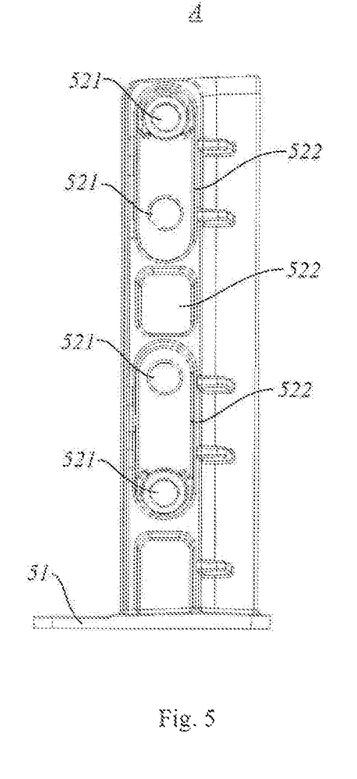
FIG. 5 shows a projection view of the bracket shown in FIG. 4 along the direction A.

Specifically, a first mounting hole 521 is provided in the first fixing portion 52, and a weight reducing groove 522 is provided on the circumferential side of the first mounting hole 521. As shown in FIG. 3, a convex column 43 is provided on the side of the panel 41 near to first fixing portion 52. The panel 41 stretches into the weight reducing groove 522 by the convex column 43 and is connected to the first fixing portion 52. A threaded hole may be provided in the convex column 43, and a fastener is engaged into the threaded hole of the convex column 43 through the first mounting hole 521. Since the weight reducing groove 522 is provided on the circumferential side of the first mounting hole 521, the weight of the bracket 5 is reduced while the structural strength of the bracket 5 is increased. It shall be understood, the weight reducing groove 522 may be provided at another position of the first fixing portion 52, for example, as shown in FIG. 5, as long as the structural strength of the first fixing portion 52 is not affected.

As an optional embodiment, the number of the first mounting holes 521 may be plural, and a plurality of corresponding convex columns 43 are provided on the panel 41. Some of the convex columns 43 are connected to the corresponding first mounting holes 521 by fasteners. Some others of the convex columns 43 are not provided with threaded holes and have slightly longer length, so they can be inserted into the remaining first mounting holes 521 or the weight reducing grooves 522. In this way, the panel 41 and the first fixing portion 52 are inserted into each other by fasteners or convex columns 43. As a result, when the end assembly 4 is subjected to vibration or impact, relative rotation between the panel 41 and the first fixing portion 52 can be prevented, and thereby the reliability of connection between the panel 41 and the first fixing portion 52 can be improved.

Figure 6:
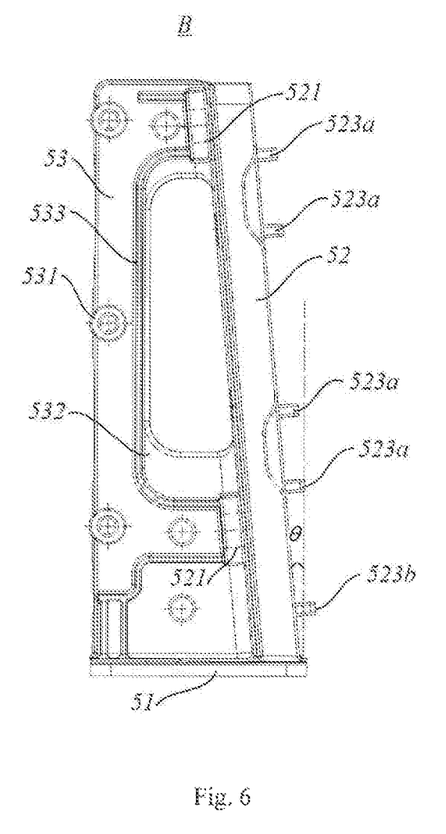
FIG. 6 shows a projection view of the bracket shown in FIG. 4 along the direction B.

Further, as shown in FIG. 6, the first fixing portion 52 is disposed by a predetermined angle θ with respect to the vertical plane, and the first fixing portion 52 has an angle of (90°-θ) with the base 51. The first fixing portion 52 is disposed to be inclined with respect to the base 51, so the first fixing portion 52 can play a certain cushioning function when an external impact force acts on the first fixing portion 52, to prevent the connection between the first fixing portion 52 and the base 51 from failure or even being broken. In addition, the end assembly 4 is disposed on the side of the cover 2, and the panel 41 thereof is located inside the second cavity 21 of the cover 2, so the height of the panel 41 in the vertical direction determines the height of the cover 2. According to the principle that the length of the hypotenuse of the right triangle is larger than the length of the right-angle side, if the panel 41 is disposed to be inclined, the height of the panel 41 in the vertical direction is reduced, and thereby the overall height of the battery pack can be reduced, and the energy density of the battery pack can be further improved.

Further, a support column 523 is provided on the first fixing portion 52. The support column 523 extends toward the panel 41 and is used to support the panel 41.

Specifically, the support column 523 includes a first support column 523a which is disposed away from the base 51. The number of the first support columns 523a is plural, and the plurality of first support columns 523a are disposed at intervals on the first fixing portion 52. The first support column 523a may be a cylinder or a column having other shapes. The first support column 523a abuts against the panel 41, so as prevent relative movement between the panel 41 and the first fixing portion 52 when the end assembly 4 is subjected to vibration and impact to cause the fastener to loosen. Therefore, the reliability of the connection between the panel 41 and the first fixing portion 52 can be further improved.

Figure 7:
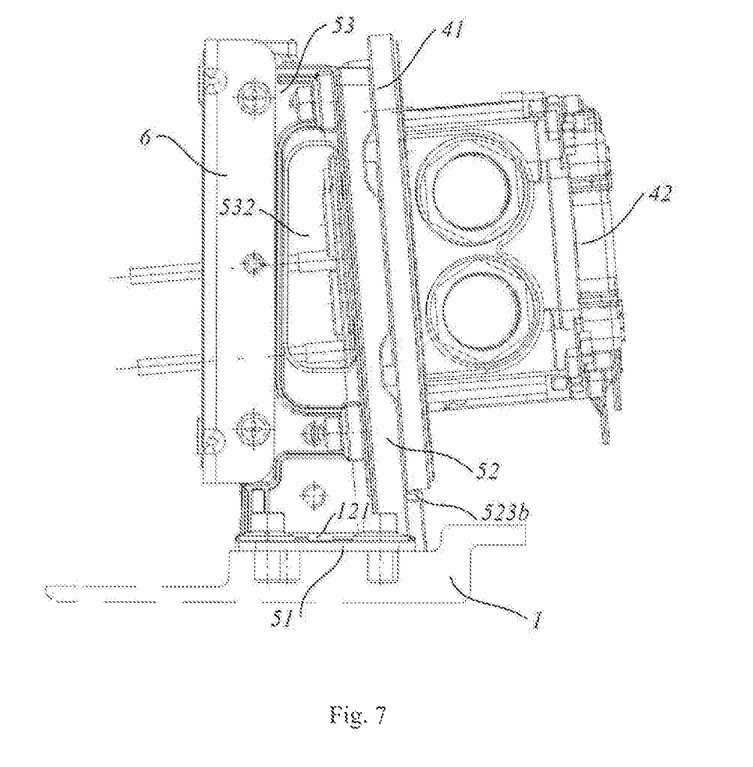
FIG. 7 shows a schematic view showing the assembled effect of the end assembly and the bracket shown in FIG. 1.

Since the bracket 5 is fixed to the casing 1 in addition to the panel 41, the height of the bracket 5 is slightly higher than the height of the panel 41. Thus, the support column 523 further includes a second support column 523b which is disposed adjacent to the base 51. As shown in FIG. 7, the second support column 523b has a top end which protrudes from the panel 41, and the second support column 523b supports the panel 41 by the side portion connected to the top end. The connector 42 disposed on the end assembly 4 has a certain weight, but the second support column 523b functions as an auxiliary support for the end assembly 4 by making full use of the assembly space between the bracket 5 and the panel 41. Thus, maximization of the space utilization is achieved as much as possible and the reliability of the connection between the end assembly 4 and the bracket 5 is further improved.

Referring again to FIGS. 3 and 4, the bracket 5 further includes a second fixing portion 53. The second fixing portion 53 is disposed on the base 51 and intersects with the first fixing portion 52. Preferably, the second fixing portion 53 is disposed to be perpendicular to the base 51 and the first fixing portion 52, such that one end of the second fixing portion 53 is connected to the base 51 and the other end thereof is connected to the first fixing portion 52. Thus, a stable triangle is formed among the base 51, and the first fixing portion 52 and the second fixing portion 53, thereby the stability of the bracket 5 is improved.

More preferably, the base 51, the first fixing portion 52, and the second fixing portion 53 may be integrally formed to form the bracket 5. The bracket 5 may be made by, for example, but not limited to, die casting.

Further, the battery pack further includes a battery monitoring unit 6 which is electrically connected to the battery assembly 3. A second mounting hole 531 is provided in the second fixing portion 53, through which the second fixing portion 53 is connected to the battery monitoring unit 6. The second mounting hole 531 may be a threaded hole or a through hole. A corresponding mounting hole is provided in the battery monitoring unit 6, and the battery monitoring unit 6 is fixed to the second fixing portion 53 by the fastener passing through the second mounting hole 531 of the second fixing portion 53 and the corresponding mounting hole of the battery monitoring unit 6.

Further, a mounting portion 12 is provided in the casing 1, a third mounting hole 511 is provided in the base 51, and the base 51 is connected to the mounting portion 12 of the casing 1 through the third mounting hole 511.

Specifically, a plurality of third mounting holes 511 may be provided in the base 51, and a positioning column 121 and a threaded hole 122 corresponding to the third mounting holes 511 may be provided on the mounting portion 12. The positioning column 121 stretches into the third mounting hole 511, and the threaded hole 122 is engaged with a fastener passing through the third mounting hole 511. As shown in FIGS. 2 and 7, three third mounting holes 511 are provided in the base 51, and two threaded holes 122 and one positioning column 112 are provided on the mounting portion 12. One positioning column 112 stretches into one of the third mounting holes 511. The two threaded holes 122 are respectively engaged with the fasteners passing through the other two of the third mounting holes 511. Thus, the base 51 and the mounting portion 12 are engaged with each other, so that when the end assembly 4 is subjected to vibration or impact, relative rotation between the base 51 and the mounting portion 12 is prevented, and thereby the reliability of the connection between the base 51 and the mounting portion 12 of the casing 1 is improved.

In addition, the battery monitoring unit 6 has a heating element such as a capacitor. In order to avoid thermal runaway, the heat generated by the battery monitoring unit 6 is transferred to the outside air through two ways. One way of dissipating heat is to transmit heat to the casing 1 through the bracket 5, wherein the battery monitoring unit 6, the bracket 5 and the casing 1 may be made of metal material having a high thermal conductivity. In order to improve the heat dissipation effect, the contact area between the base 51 and the mounting portion 12 of the casing 1 may be increased, and heat dissipation fins or the like may be provided on the casing 1, to transfer heat to the outside air through the casing 1. Another way of dissipating heat is to contact the bracket 5 with the panel 41 of the end assembly 4. Since the connector 42 on the panel 41 is disposed outside the enclosed space, it can generate convection with the outside air. Thus, heat can be transferred to the connector 41 of the end assembly 4 through the bracket 5 and be then diffused into the outside air. The battery monitoring unit 6 transfers heat to the casing 1 and the end assembly 4 through the bracket 5, thereby the overall heat capacity is increased and the heat dissipation effect is improved.

In addition, since that bracket 5 has a stable triangular structure, and the first fixing portion 52 of the bracket 5 and the panel 41 of the end assembly 4, the base 51 and the mounting portion 12 of the casing 1, the second fixing portion 53 and the battery monitoring unit 6 are connected by fasteners, each member can be independently assembled or disassembled by the tools, thereby convenience and feasibility of assembly and disassembly is improved.

Referring again to FIGS. 3 and 6, each connector 42 and safety member of the end assembly 4 have lead wire harness, this is because, for example, the positive high-voltage connector and the negative high-voltage connector need to be electrically connected to the battery assembly 3, the low-voltage input connector and the low-voltage output connector need to be electrically connected to the battery monitoring unit 6, and the heating input connector and the heating output connector need to be electrically connected to the battery assembly 3. In order to organize the wire harness and prevent wiring errors, a wire fixing structure such as a wire harness clip may be provided on the panel 41 to sort the wire harness. In addition, a through hole 532 is further provided in the second fixing portion 53, and a protective edge 533 protruding outwardly is provided on the circumferential side of the through hole 532. The organized wire harness may pass through the through hole 532 and be electrically connected to the corresponding member. The protective edge 533 can prevent the wire harness from being worn by the edge of the through hole 532, thereby improving the reliability of the wire harness. In addition, the protective edge 533 protrudes from the mounting surface of the second fixing portion 53 and the battery monitoring unit 6, and therefore, it can function as a limiting support when the battery monitoring unit 6 is installed, and can prevent the battery monitoring unit 6 from cutting the wiring harness.

In addition, an anti-collision member 7 is provided on the bracket 5. A guide groove may be provided on the anti-collision member 7 to guide the wire harness direction of each connector. Some yielding structures may be provided on the anti-collision member 7 to evade the wire harness outlet of the connector, wire harness clip, and the like. The anti-collision member 7 may be fixed between the bracket 5, the battery monitoring unit 6, and the panel 41 by adhesive bonding or by fasteners, to protect the wire harness of the end assembly 4 from being damaged under abrasion, pulling, or the like.

Therefore, in the battery pack according to the embodiment of the disclosure, the bracket 5 is designed to have a stable triangular structure, so the end assembly 4 can be stably and reliably fixed to the casing 1. By making full use of space utilization, the first fixing portion 52 of the bracket 5 is disposed to be inclined with respect to the vertical plane, so the overall height of the battery pack is further reduced. In addition, the bracket 5 can effectively transfer the heat generated by the battery monitoring unit 6 to the outside air, thereby the reliability of the battery pack is improved and the overall stability of the battery pack is further improved. In the disclosure, the overall height of the battery pack is reduced and the total weight thereof is reduced, meanwhile, the maintenance cost is reduced and the energy density of the battery pack is improved.

Although the disclosure has been described with reference to the above preferred embodiments, various modifications may be made thereto and the members therein may be replaced with equivalents without departing from the scope of the disclosure. In particular, each technical feature mentioned in the various embodiments may be combined in any manner as long as there is no structural conflict. The disclosure is not limited to the specific embodiments disclosed herein, but includes all technical solutions falling within the scope of the claims.

REFERENCE NUMERALS 1 casing
11 first receiving cavity
12 mounting portion
121 positioning column
122 threaded hole
2 cover
21 second receiving cavity
22 window
3 battery assembly
4 end assembly
41 panel
42 connector 43 convex column
5 bracket
51 base
511 third mounting hole
52 first fixing portion
521 first mounting hole
522 weight reducing groove
θ predetermined angle
523 support column
523a first support column
523b second support column
53 second fixing portion
531 second mounting hole
532 through hole
533 protective edge
6 battery monitoring unit
7 anti-collision member

What is claimed is:

1. A battery pack, comprising:
    a casing;
    a cover, which is disposed to cover the casing;
    a battery assembly, which is disposed within an enclosed space formed by the casing and the cover; and
    an end assembly, which includes a panel and two or more connectors fixed to the panel, wherein the battery assembly is electrically connected to a device outside the enclosed space by the connectors, the panel is sealedly connected to the casing or the cover, and the panel is fixedly connected to the casing by a bracket, wherein
    the bracket includes a base and a first fixing portion disposed on the base, the first fixing portion is connected to the panel, and the base is connected to the casing,
    the first fixing portion is further provided with a support column, which extends toward the panel and is used to support the panel, and
    the support column includes a first support column which is disposed away from the base and a second support column which is disposed adjacent to the base, the first support column abuts against the panel, the second support column has a top end which protrudes from the panel, and the second support column supports the panel by a side portion connected to the top end.

2. The battery pack according to claim 1, wherein the first fixing portion is disposed to be inclined by a predetermined angle θ with respect to a vertical plane, and the first fixing portion has an angle of (90°-θ) with the base.

3. The battery pack according to claim 1, wherein a first mounting hole is provided in the first fixing portion, and a weight reducing groove is provided on a circumferential side of the first mounting hole, a convex column is provided on the side of the panel near to first fixing portion, and the panel stretches into the weight reducing groove through the convex column and is connected to the first fixing portion.

4. The battery pack according to claim 2, wherein a first mounting hole is provided in the first fixing portion, and a weight reducing groove is provided on a circumferential side of the first mounting hole, a convex column is provided on the side of the panel near to first fixing portion, and the panel stretches into the weight reducing groove through the convex column and is connected to the first fixing portion.

5. The battery pack according to claim 1, wherein the bracket further comprises a second fixing portion, which is disposed on the base and intersects with the first fixing portion.

6. The battery pack according to claim 5, wherein the battery pack further comprises a battery monitoring unit which is electrically connected to the battery assembly, and the second fixing portion is provided with a second mounting hole, through which the second fixing portion is connected to the battery monitoring unit.

7. The battery pack according to claim 6, wherein a through hole is provided in the second fixing portion, a protective edge protruding outwardly is provided on a circumferential side of the through hole, and a wiring harness of the two or more connectors passes through the through hole.

8. The battery pack according to claim 1, wherein a mounting portion is provided on the casing, and the base is provided with a third mounting hole, through which the base is connected to the mounting portion of the casing.

9. The battery pack according to claim 8, wherein the mounting portion is provided with a positioning column and a threaded hole corresponding to the third mounting hole, the positioning column stretches into the third mounting hole, and the threaded hole is engaged with a fastener passing through the third mounting hole.

10. The battery pack according to claim 1, wherein the number of the brackets is at least two, and an anti-collision member is provided between the brackets.

11. The battery pack according to claim 1, wherein the cover is provided with a window, through which the connectors are located outside the enclosed space, and through which the panel is sealedly connected to the cover.

* * * * *